United States Patent
MacDonald et al.

(10) Patent No.: US 6,821,367 B1
(45) Date of Patent: Nov. 23, 2004

(54) ULTRASONIC TOOL AND METHOD FOR SECURING A COVERING TO A FRAME

(75) Inventors: Douglas B. MacDonald, Caledonia, MI (US); Daniel V. Constantino, Wayland, MI (US); Dean K. Hubbard, Byron Center, MI (US); Robert T. Ruthven, Wayland, MI (US); Daniel M. Ursul, Grand Rapids, MI (US); Larry B. Hanify, Marne, MI (US)

(73) Assignee: Steelcase Development Corporation, Caledonia, MI (US)

( * ) Notice: Subject to any disclaimer, the term of this patent is extended or adjusted under 35 U.S.C. 154(b) by 0 days.

(21) Appl. No.: 10/403,355

(22) Filed: Mar. 31, 2003

(51) Int. Cl.[7] ............................................... B29C 65/08
(52) U.S. Cl. ..................... 156/73.3; 156/73.1; 156/196; 156/267; 156/498; 156/510; 156/580.1; 156/580.2
(58) Field of Search ............................... 156/73.1, 196, 156/267, 308.2, 308.4, 498, 510, 580.1, 580.2, 64, 73.3

(56) References Cited

U.S. PATENT DOCUMENTS

| | | | |
|---|---|---|---|
| 3,734,813 A | 5/1973 | Pohl | |
| 4,213,493 A | 7/1980 | Haworth | |
| 4,496,407 A | * 1/1985 | Lowery et al. | ............ 156/73.3 |
| 5,070,666 A | 12/1991 | Looman | |
| 5,238,515 A | 8/1993 | Insalaco et al. | |
| 5,258,083 A | 11/1993 | Monk et al. | |
| 5,407,522 A | 4/1995 | Insalaco et al. | |
| 6,132,666 A | 10/2000 | Foley et al. | |
| 6,202,381 B1 | 3/2001 | Dame et al. | |
| 6,223,485 B1 | 5/2001 | Beck et al. | |
| 6,226,849 B1 | 5/2001 | Beck et al. | |
| 6,309,490 B1 | 10/2001 | Davis et al. | |
| 6,547,904 B1 | * 4/2003 | Young | ........................ 156/73.1 |

* cited by examiner

*Primary Examiner*—James Sells
(74) *Attorney, Agent, or Firm*—Rader, Fishman & Grauer, PLLC

(57) ABSTRACT

A method is disclosed for securing a flexible covering about a frame having a peripheral edge and at least one corner. A portion of the flexible covering is folded over the peripheral edge of the frame at or about the corner and an excess portion of the covering is provided. Ultrasonic welding is used to create a seam of contacting portions of the flexible covering. In an embodiment, the excess portion of the flexible covering is removed in connection with the welding operation. An apparatus for securing a flexible covering about a frame is also provided.

23 Claims, 8 Drawing Sheets

ULTRASONIC TOOL AND METHOD FOR SECURING A COVERING TO A FRAME

BACKGROUND OF THE INVENTION

1. Field of the Invention

The present invention relates to ultrasonic acoustic tooling, including an ultrasonic acoustic tool suitable for securing a flexible covering to a corner or peripheral edge of a frame.

2. Description of the Related Art

Partition wall systems for use in work environments to create individual or group workspaces are known. Such partition wall systems commonly include a panel section made of an internal, rigid, structural frame, typically made of metal. In such known partition wall systems, the frame generally includes parallel top and bottom members joined in a perpendicular arrangement with parallel side members in a rectilinear or "picture frame" configuration. The frame may be "open" (e.g., having a central open space) or may be wholly or partially "filled" by a solid sheet or other material.

An insert or partition panel cover, commonly referred to as a "tile" or "skin," is typically installed on the panel section of the partition wall system. The partition panel cover generally includes a decorative and/or functional covering, such as a flexible sheet of fabric, which is secured to a supportive frame or pan. The covering of the partition panel cover is commonly hand-trimmed to the desired length, folded to the desired shape over the frame, and is then secured to the frame using a suitable adhesive. The corners of such "hand-made" partition panel covers are often non-uniform, rounded and/or may exhibit frayed edges where the fabric has been trimmed. In many cases, non-uniformity in the corners of the partition panel cover can compromise the overall appearance of the partition wall system.

For these and other reasons, it is desirable to provide an improved means for securing coverings to frames.

SUMMARY OF THE INVENTION

A method is disclosed for securing a flexible covering about a frame having a peripheral edge and at least one corner. A portion of the flexible covering is folded over the peripheral edge of the frame at or about the corner and an excess portion of the covering is provided. Ultrasonic welding is used to create a seam of contacting portions from portions of the flexible covering. In an embodiment, the excess portion of the flexible covering is removed in connection with the welding operation. An apparatus for securing a flexible covering about a frame is also provided.

BRIEF DESCRIPTION OF THE DRAWINGS

Embodiments of the invention will now be described, by way of example, with reference to the accompanying drawings, wherein.

DETAILED DESCRIPTION

Figure 1:
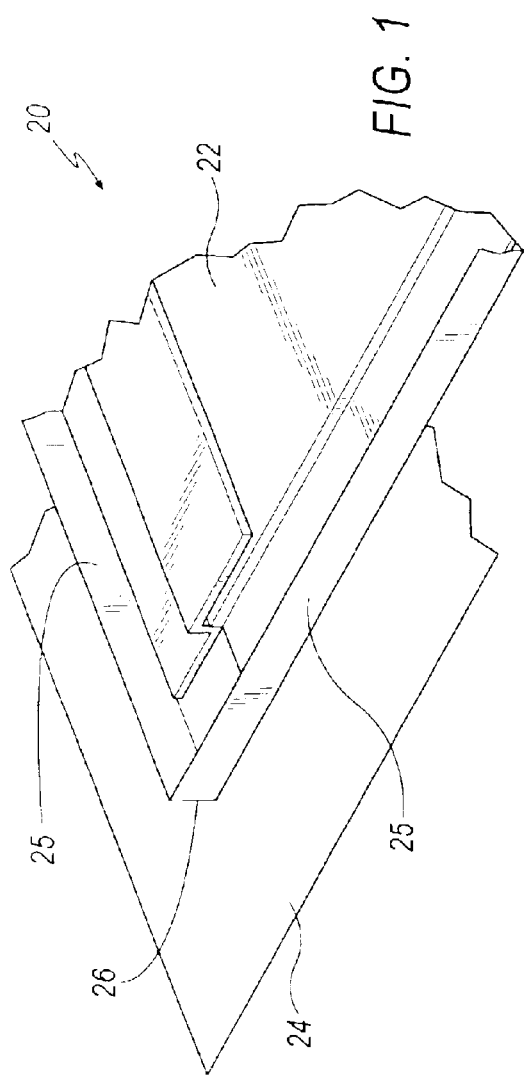
FIG. 1 is a partial perspective view of a corner of an exemplary partition panel cover shown prior to folding an covering around a supportive frame.

Referring now to the drawings, illustrative embodiments of the present invention are shown in detail. Although the drawings represent some preferred embodiments of the invention, the drawings are not necessarily to scale and certain features may be exaggerated to better illustrate and explain the present invention. Further, the embodiments set forth herein are not intended to be exhaustive or otherwise limit or restrict the invention to the precise configurations shown in the drawings and disclosed in the following detailed description.

Figure 3:
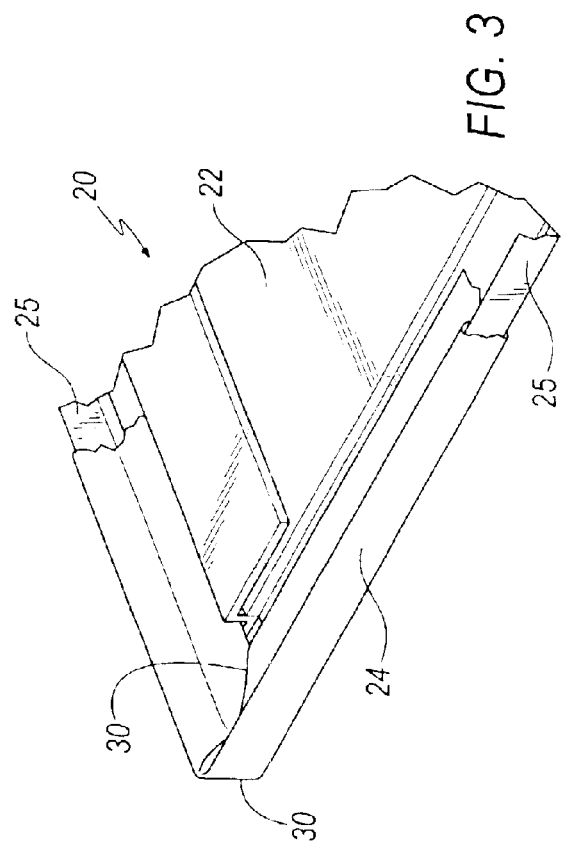
FIG. 3 is a partial perspective view of the partition panel cover of FIG. 1 after the excess covering has been welded and trimmed from the supportive frame according to the method of the present invention.
Figure 2:
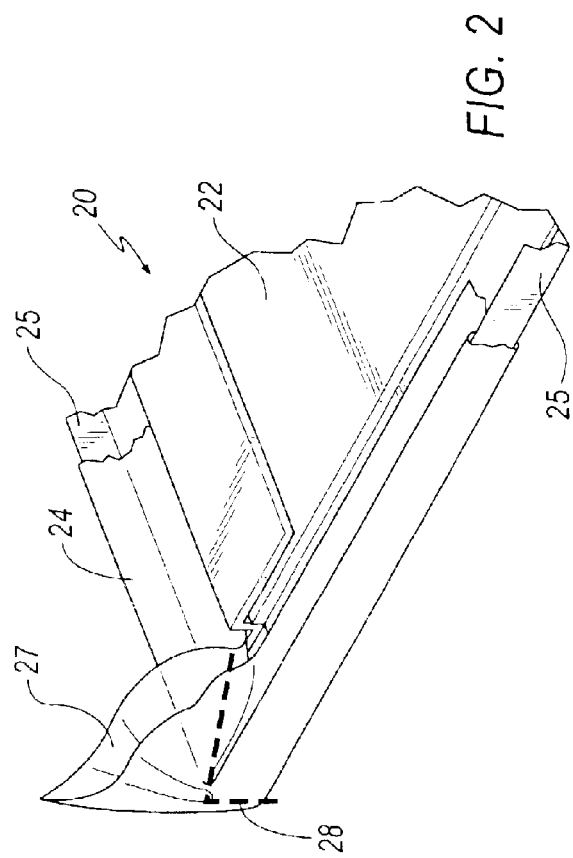
FIG. 2 is a partial perspective view of the partition panel cover of FIG. 1 after the covering has been folded around a peripheral edge of the supportive frame, allowing excess covering material to gather at the corner of the supportive frame.

Referring to FIGS. 1–3, the corner of an exemplary partition panel cover (or "skin") 20 is shown. Partition panel cover 20 includes a frame 22 that is covered, at least in part, by a covering 24. In the illustrated embodiment, covering 24 is a flexible sheet of polymeric fabric, such as woven polyester, which preferably is fusible in response to the application of ultrasonic energy. However, it will be appreciated that covering 24 is not limited to a polymeric fabric or woven polyester and may include other ultrasonically fusible or heat-activated materials, including without limitation, thermoplastic films and heat activated resins.

During manufacture of partition panel cover 20, covering 24 is produced or cut to the desired length and width, both of which are typically slightly longer than the corresponding length and width of the associated frame 22, so that a portion of covering 24 can be folded around a peripheral edge 25 of frame 22. FIG. 1 illustrates partition panel cover 20 prior to folding the covering 24 around peripheral edge 25 and securing the covering 24 to frame 22.

It should be noted that while certain embodiments of a frame 22 are shown in the corresponding drawing figures, the term "frame" should not be so limited, and may include various other types of support structures and geometric configurations. Similarly, the "peripheral edge" is generally depicted in the illustrated embodiments as including a substantially perpendicular corner. However, the invention is not so limited and the peripheral edge may form other types of edges or corner formations.

Referring to FIG. 2, covering 24 is shown folded around peripheral edge 25 and is positioned against or is otherwise secured to portions of frame 22 such that excess covering material (e.g., in the form of a flap of material 27 that extends from the frame 22) is generally provided about the corner 26. In the illustrated embodiment, at least a portion of covering 24—such as a portion adjacent the edge 25 —is secured to frame 22 using a suitable adhesive. However, other means known in the art may be used to secure covering 24 to frame 22 without departing from the spirit and scope of the present invention.

Upon sufficiently securing portions of the covering 24 to the frame 22, the excess covering material that has formed or gathered at or about the corner 26 of frame 22 is secured together and is trimmed or otherwise removed. In a preferred embodiment, portions of the covering 24 adjacent to the excess covering material are secured together, in substantially on an edge-to-edge basis, by ultrasonically welding overlapping or contacting portions of the covering material together to form a seam. The application of ultrasonic energy rapidly heats the covering material allowing the contacting portions of covering 24 to melt together and then join as they cool. A weld line 28, or area in which the contacting portions of covering 24 are joined, is represented by a dashed line in FIG. 2. The seam 30 that is created when contacting portions of covering 24 are welded at the corners 26 of frame 22 is generally shown in FIG. 3, but may or may not be visible to the human eye depending on the type of covering material used. Seam 30 may be substantially continuous, as shown in FIG. 3, or may include several discrete seam portions that cooperatively weld the covering material together. The ultrasonic energy applied to covering 24 may also be utilized to trim the excess covering material at the corner 26 of frame 22, as will be discussed in further detail below.

Referring to FIGS. 4–11, there is shown an embodiment of a corner fabrication tool 32 that can be used for ultrasonically welding and trimming the covering 24. While corner fabrication tool 32 is described herein with respect to a manufacturing process for attaching an ultrasonically fusible covering to the framework of a partition panel cover, the present invention can be readily modified for other manufacturing processes that apply an ultrasonically fusible covering to a other types of frames and/or supportive substrates.

Figure 4:
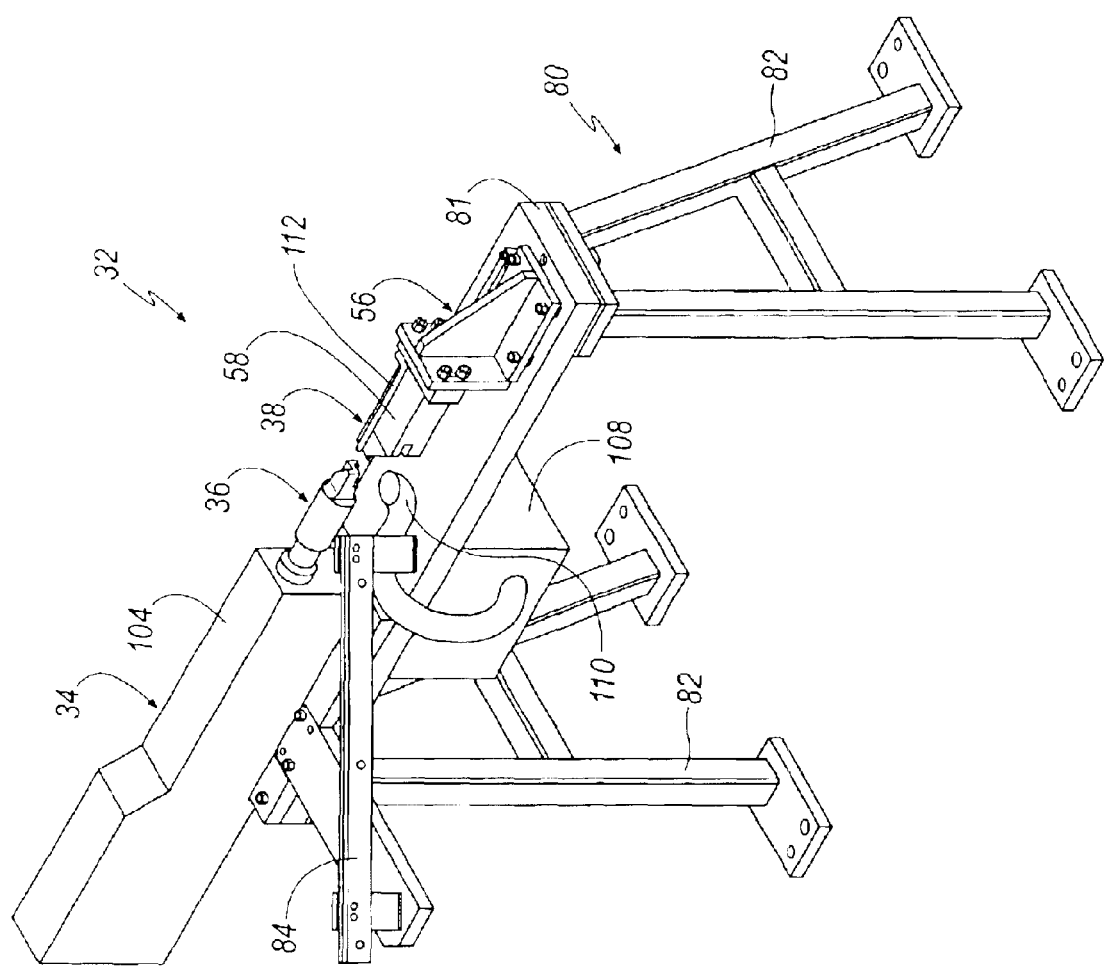
FIG. 4 is a perspective view of a corner fabrication tool according to an embodiment of the present invention.

As illustrated in FIG. 4, corner fabrication tool 32 includes an ultrasonic control system 34 having various components that cooperatively generate and apply ultrasonic energy to covering 24, such as through an acoustic horn 36. In certain embodiments, the acoustic horn 36 is a half- or full-wave design suitable for ultrasonically welding and trimming an ultrasonically fusible material. As will be discussed in further detail below, an acoustic horn 36 can transmit mechanical vibrations to covering 24 at a predetermined frequency when the acoustic horn 36 is moved from a first or "non-working" position (e.g., shown in FIG. 4) to a second or "working" position proximate an anvil 38, thereby pressing or sandwiching a portion of the covering 24 therebetween.

Referring to FIGS. 5–7B, detailed views of an embodiment of an acoustic horn 36 and anvil 38 are shown. In a representative embodiment, horn 36 includes a metal body having a generally rectangular working portion 40 that extends from a substantially cylindrical portion 42. It is important to note that while the embodiment shown incorporates a particular geometry for acoustic horn 36, the present invention is not limited to such a configuration or style. In fact, horn 36 can be of any shape, such as rectangular, rectangular slotted, circular solid, circular hollow, circular slotted, circular high gain, catenoidal or exponential.

Figure 5:
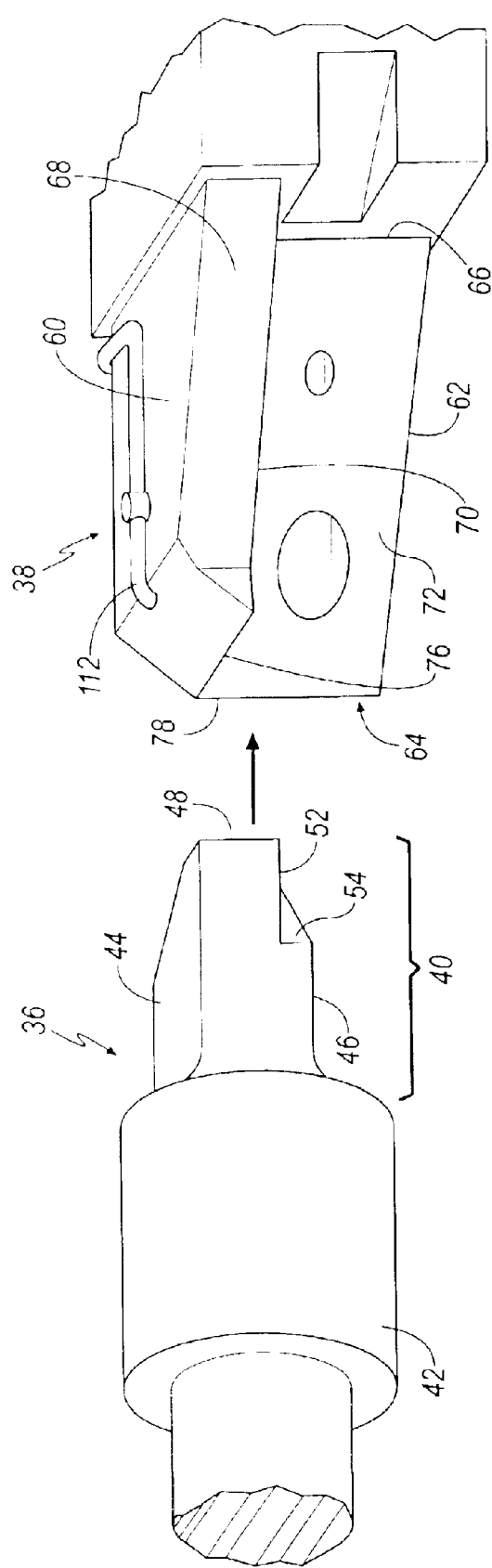
FIG. 5 is a detailed perspective view of an acoustic horn and an anvil according to an embodiment of the present invention, showing the orientation of the horn and anvil prior to welding and trimming the excess covering.
Figure 6:
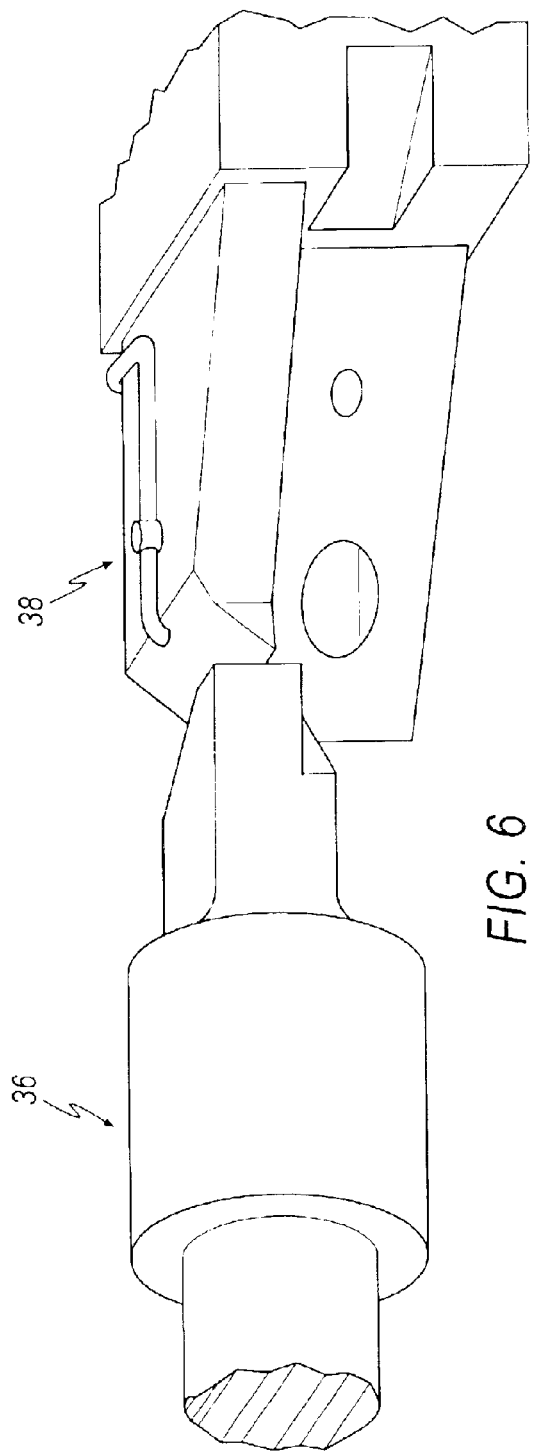
FIG. 6 is a detailed perspective view showing the orientation of the horn and anvil of FIG. 5 during the process of welding and trimming the excess covering.
Figure 7:
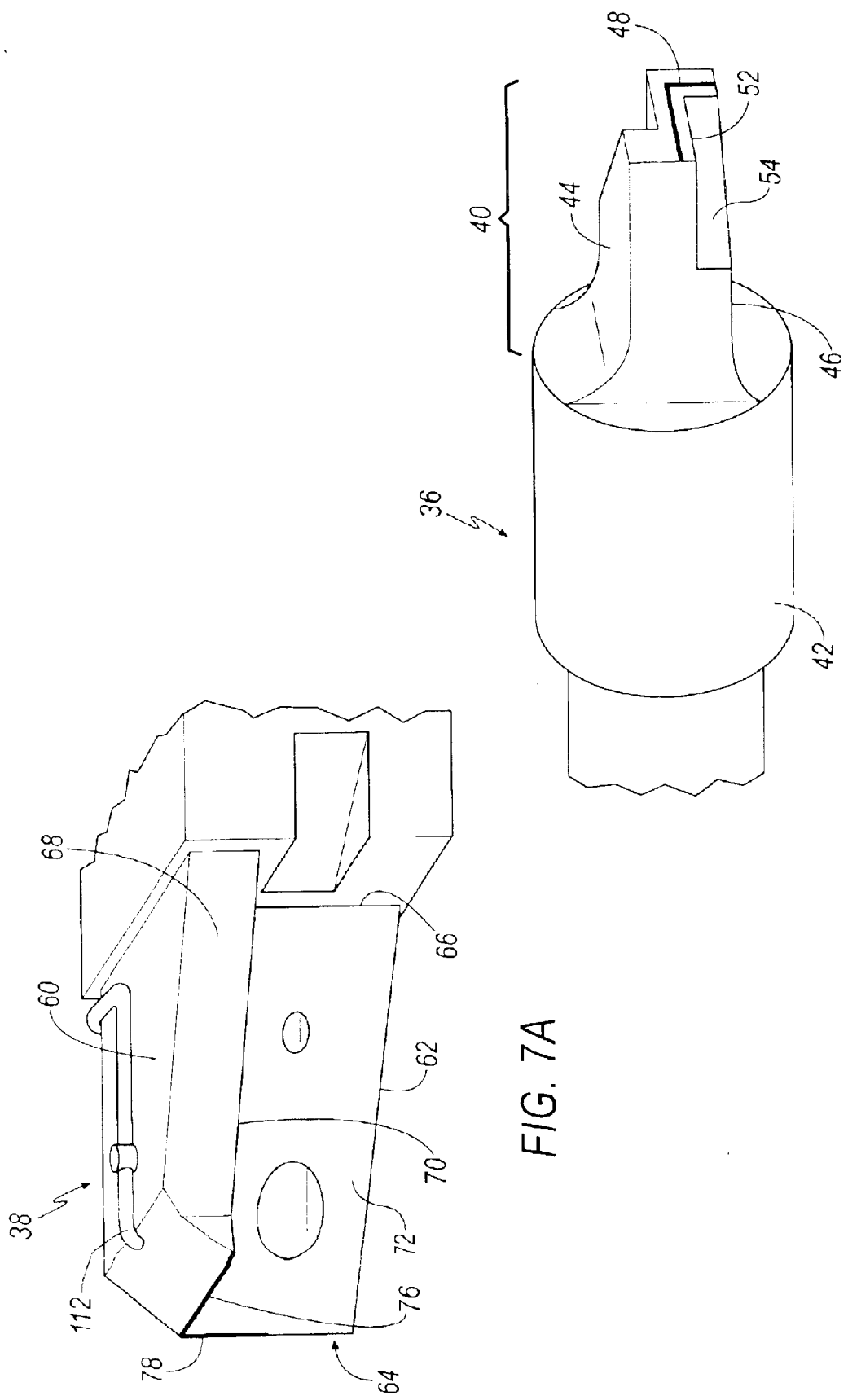
FIG. 7A is a detailed perspective view of the anvil of FIG. 5, highlighting the work edge.
FIG. 7B is a detailed perspective view of the acoustic horn of FIG. 5, highlighting the weld line against which the excess covering is sandwiched by the working edge of the anvil as the covering is welded and trimmed.
Figure 8:
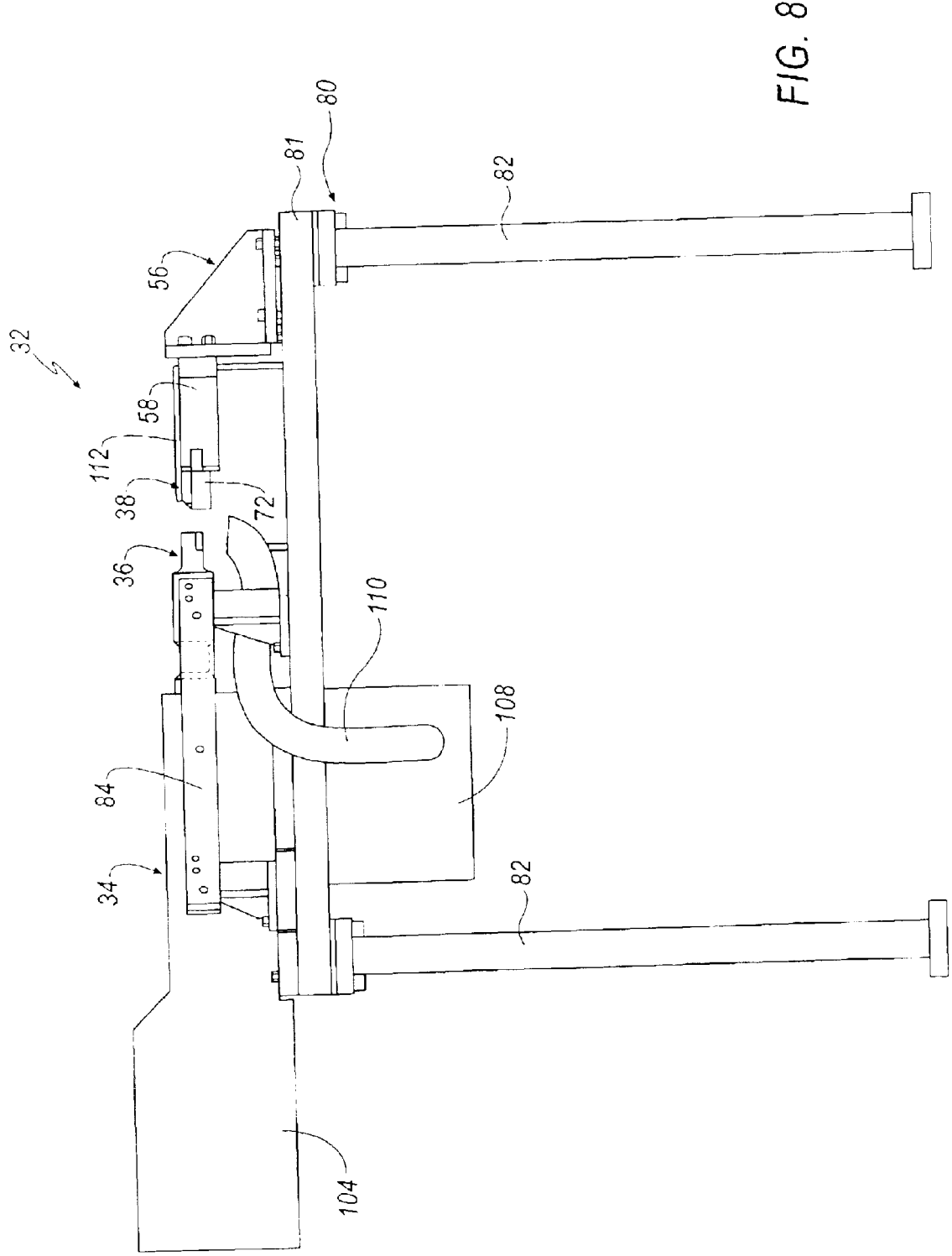
FIG. 8 is a front elevational view of the corner fabrication tool of FIG. 4.
Figure 9:
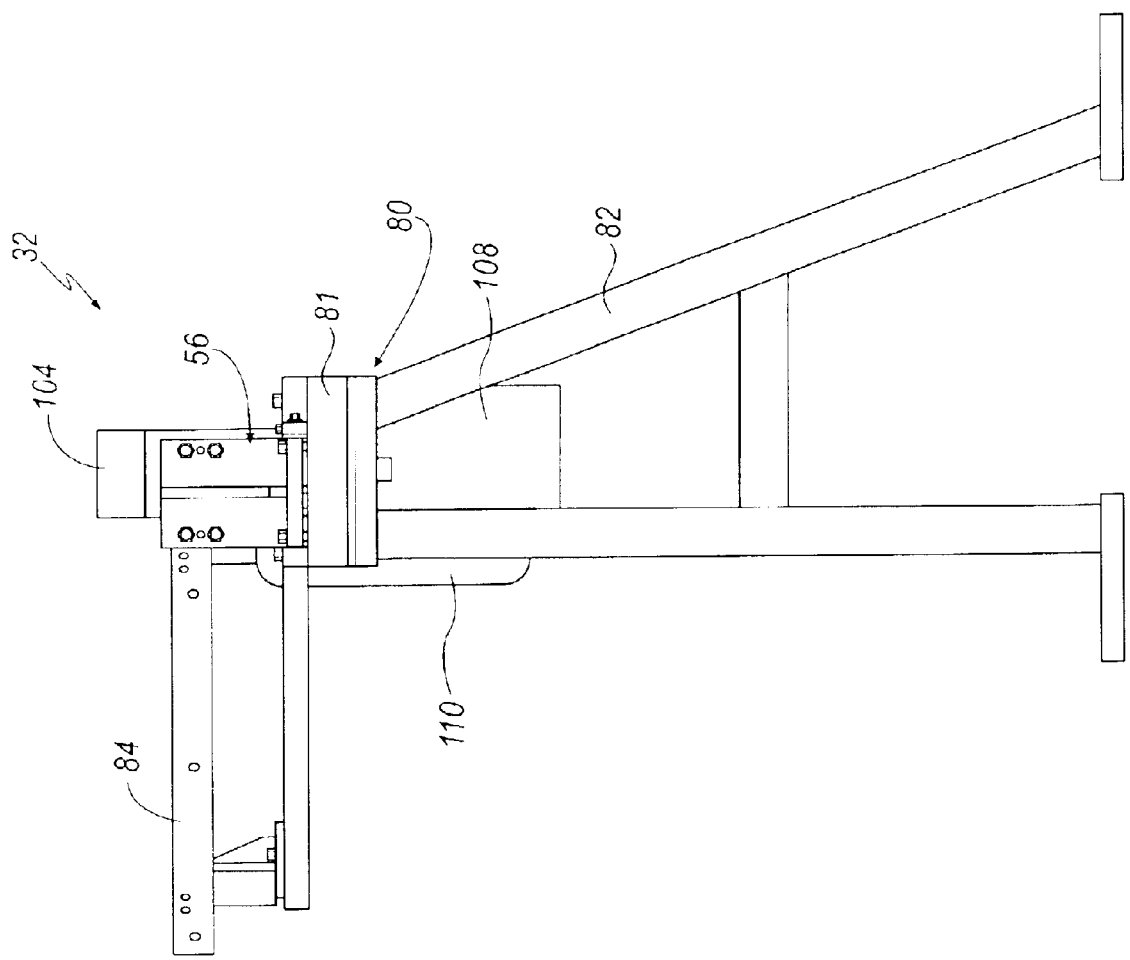
FIG. 9 is a side elevational view of the corner fabrication tool of FIG. 4.

In the disclosed embodiment, working portion 40 includes an upper surface 44, a lower surface 46 and a relatively vertical working surface 48. Lower surface 46 includes a recess 52 adjacent working surface 48 that is defined by a generally vertical alignment surface 54. As shown in FIGS. 5 and 7B, alignment surface 54 may taper away from working surface 48 toward cylindrical portion 42 at a predetermined angle.

As illustrated in FIGS. 4 and 8–10, anvil 38 may be supported on the corner fabrication tool 32 by a bracket 56. Optionally, an extension member 58 may be provided between anvil 38 and bracket 32 to position anvil 38 for engagement with horn 36. In the disclosed embodiment, anvil 38 is removably attached to extension member 58, allowing anvil 38 to be replaced if it becomes worn or damaged. Anvil 38 and extension member 58 may also be removable from bracket 56 and interchangeable with other anvil and extension member configurations to accommodate various partition panel cover designs.

Anvil 38 includes an upper surface 60, a lower surface 62, a working edge 64 facing acoustic horn 36, and an attachment end 66 facing extension member 58. As shown in the embodiment of FIG. 5, an inner edge 68 of anvil 38 tapers outwardly as it extends from attachment end 66 toward working edge 64. Like the working portion 40 of acoustic horn 36 described above, lower surface 62 of anvil 38 may also includes a recess 70, which may include a generally vertical alignment surface 72 that extends from working edge 64 toward attachment end 66 at a predetermined angle.

In an embodiment of the anvil, the working edge 64 is substantially L-shaped having a generally horizontal edge portion 76 and a generally vertical edge portion 78. The generally vertical edge portion 78 corresponds to a vertical component of weld line 28 shown in FIG. 2. Similarly, the generally horizontal edge portion 76 corresponds to a horizontal component of weld line 28, which extends diagonally from corner 26 toward the center of partition panel cover 20. While each edge portion 76, 78 is defined by two or more converging surfaces to focus pressure against covering 24 as it is pressed or sandwiched between horn 36 and anvil 38, working edge 64 is not necessarily a knife-edge. Rather, working edge 64 may include a slight radius to minimize wear and damage due to impact with working surface 48 of 36 as the excess covering material is trimmed.

In the embodiment illustrated in FIGS. 4 and 8–10, ultrasonic control system 34, horn 36 and anvil 38 are supported by a base 80 that includes a relatively flat plate 81 elevated from the floor by a pair of A-frame legs 82. Corner fabrication tool 32 is positioned adjacent a table (not shown), upon which the partition panel cover 20 is laid during manufacture. It is recognized, however, that ultrasonic control system 34, horn 36 and anvil 38 may be mounted to any supporting structure in a cell or workstation, and that the present invention is not limited to the particular support structure disclosed in the drawings.

Figure 10:
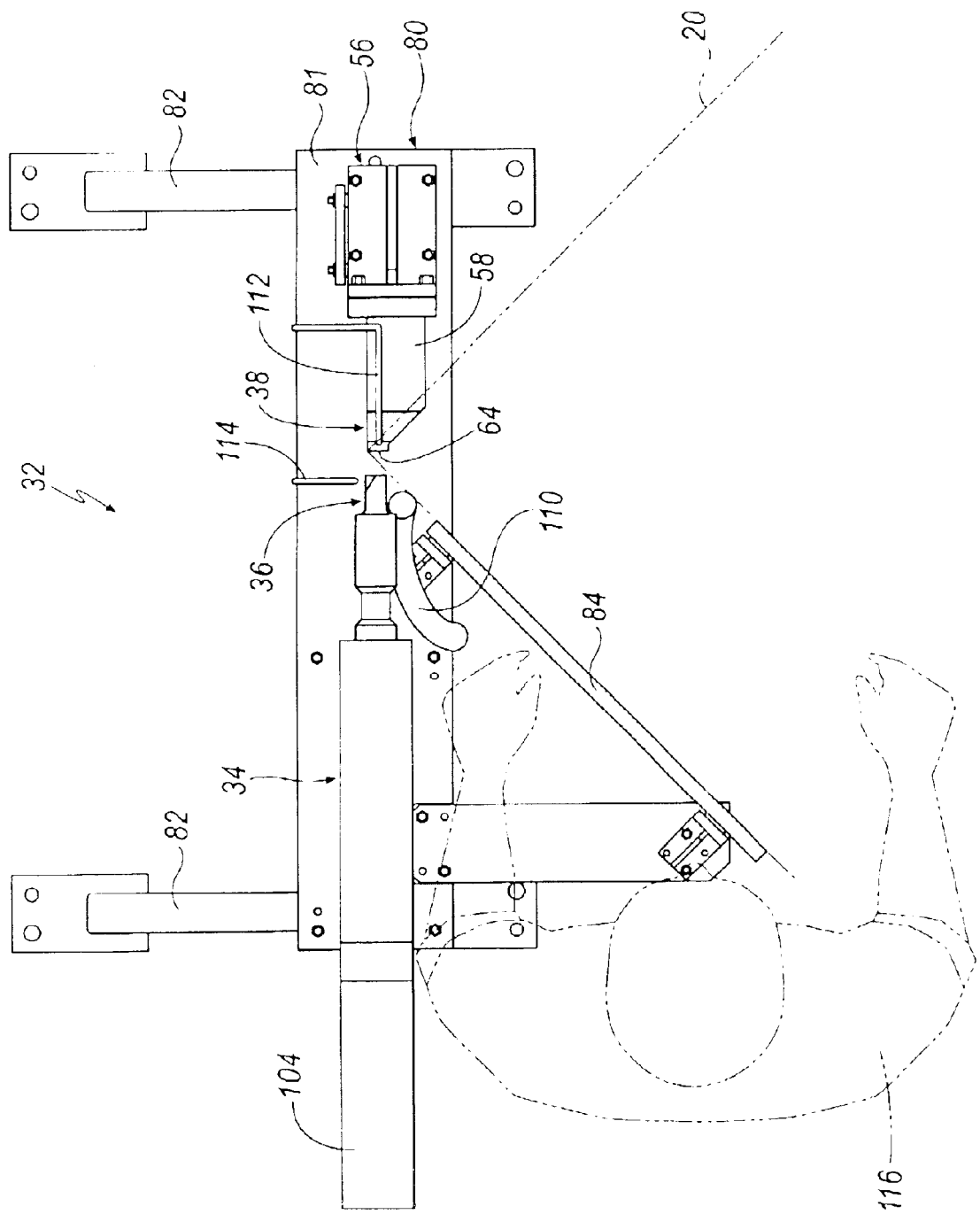
FIG. 10 is an overhead view of the corner fabrication tool according of FIG. 4 showing a partition panel cover and tool operator, in phantom, during manufacture of the partition panel cover.

In some embodiments of the invention, a guide rail 84 is affixed to corner fabrication tool 32 and is positioned at a predetermined angle relative to working edge 64 of anvil 38, for example, as shown in FIG. 10. Guide rail 84 can be configured to cooperate with alignment surface 72 of anvil 38 to position panel cover 20 during the welding and trimming operation. As shown in FIG. 10, because the exemplary partition panel cover 20 is rectangular, guide rail 84 is positioned at an angle of approximately 45 degrees relative to the working edge 64 of anvil 38. Alignment surface 72 of anvil 38 extends from working edge 64 to attachment end 66 at an angle of approximately 45 degrees relative to working edge 64. Similarly, alignment surface 54 of acoustic horn 36 extends from working surface 48 at an angle of approximately 45 degrees. Alignment surfaces 54 and 72 function to properly position partition panel cover 20 between acoustic horn 36 and anvil 38 when acoustic horn 36 is moved to the "working" position shown in FIG. 6. However, it will be appreciated that the previously mentioned angles may be more or less than 45 degrees depending on the geometry of panel cover 20 or frame.

Figure 11:
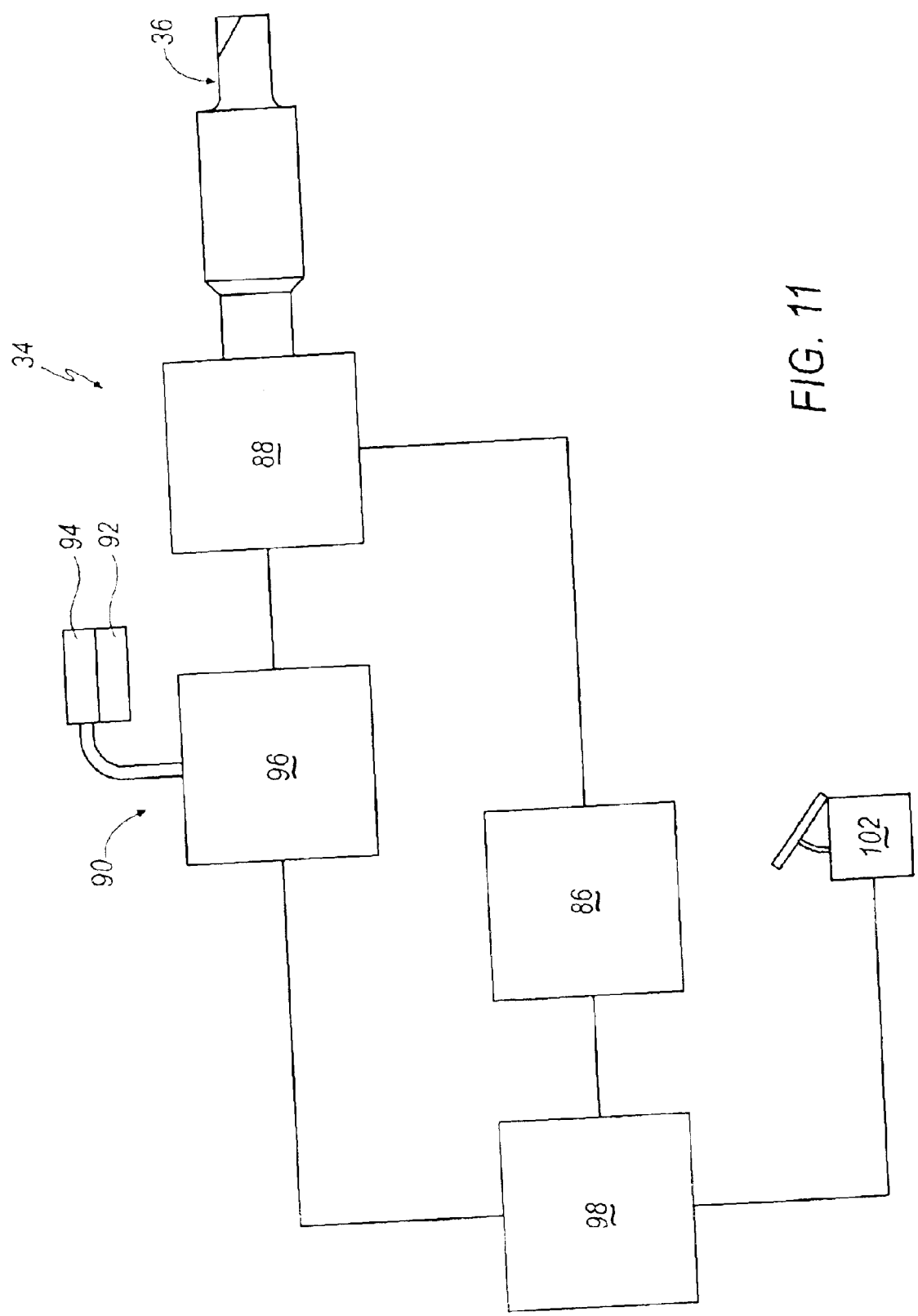
FIG. 11 is a schematic that generally illustrates the components of the corner fabrication tool of FIG. 4.

The components of an embodiment of an ultrasonic control system 34 are depicted schematically in FIG. 11. The ultrasonic control system 34 may include a generator 86 for transferring high frequency electrical voltage to a converter 88. Converter 88 is coupled to acoustic horn 36 and, when energized by electrical generator 86, converter 88 may set acoustic horn 36 into resonance along its longitudinal axis. In a preferred embodiment, converter 88 converts the electrical energy from generator 86 into high frequency vibratory motion, and transfers this vibratory motion to acoustic horn 36. Acoustic horn 36 is typically vibrated at a frequency in a range between about 1 and 100 kHz, and is commonly vibrated at 20 kHz, 30 kHz, or 40 kHz.

The control system 34 may also includes an actuation controller 90 for applying a force to move horn 36 between the "working" and "non-working" positions. For example, without limitation, in the disclosed embodiment, actuation controller 90 is pneumatically operated and includes an air supply 92, a regulation system 94 for regulating the air generated by the air supply 92, and a force generating means 96. Any suitable air pressure system can be used to implement the regulation system 94 and air supply 92. Similarly, any suitable force generating means may be implemented to move horn 36, such as a pneumatic cylinder or inflatable bladder. Acoustic horn 36 may be coupled to actuation controller 90 using electronic and pneumatic components well known in the art.

Alternatively, or in conjunction with movement of acoustic horn 36, anvil 38 may be moved toward acoustic horn 36. While this embodiment is not illustrated in the drawings, it will be appreciated than an actuation controller similar to that described for acoustic horn 36 may be used to move anvil 38.

In one embodiment of the invention, acoustic horn 36 applies a force to covering 24 based on the predetermined air pressure, which corresponds to a desired actuation force to be applied to covering 24. Movement of converter 88 and acoustic horn 36 is dictated by a control unit 98, which may be programmed using suitable control logic capable of controlling the movement of the acoustic horn 36 and the application of the vibratory energy to covering 24. An input means 102, such as a foot pedal operated switch, may be placed in communication with control unit 98. In response to an operator initiated input via input means 102, control unit 98 causes acoustic horn 36 to be moved reciprocatingly from the first, "non-working" position to the second, "working" position and returned to the first position, such as shown in FIG. 4. In conjunction with this movement, acoustic horn 36 is vibrated at a sufficient or prescribed frequency to weld and trim covering 24 at the corner 26 of frame 22.

In an embodiment, such as the one illustrated, various components of ultrasonic control system 34, excluding at least a portion of the horn 36, may be incased in a module 104 that includes a suitable interface (not shown) for connecting electric and fluid power. An exemplary module for use in connection with the corner fabrication tool 32 is the 2000 Series Sonic Weld Actuator, manufactured and sold by Branson Ultrasonics Corporation.

The working components of corner fabrication tool 32, include without limitation, an acoustic horn 36 and an anvil 38, which are optionally encapsulated within a protective, transparent cover (not shown) having an opening adjacent the acoustic horn 36 and anvil 38 that permits insertion of partition panel cover 20 into the area between acoustic horn 36 and anvil 36. Additionally, corner fabrication tool 32 may include a scrap removal system for removing the excess covering material trimmed from partition panel cover 20. In the embodiment illustrated in FIGS. 4 and 8–10, the scrap removal system includes a vacuum 108 having a vacuum inlet tube 110 and a pair of cooperating air nozzles 112 and 114 for applying air to push the trimmed covering material toward vacuum inlet tube 110. The air applied by air nozzle 112 may also be used to cool the welded portions of covering 24 prior to moving partition panel cover 20 away from corner fabrication tool 32. Operation of vacuum 108 and air nozzles 112, 114 may also controlled by control unit 98.

An embodiment of the operation of a corner fabrication tool will now be described with reference to FIGS. 5–7 and 10. As notedabove, corner fabrication tool 32 is positioned adjacent a table upon which partition panel cover 20 may be slid into position between acoustic horn 36 and anvil 38. As shown in FIG. 10, an operator 116 slides partition panel cover 20 into position using guide rail 84 and alignment surface 72 on anvil 38. Once corner 26 of frame 22 is in the correct position, the operator 116 initiates movement of acoustic horn 36 via input means 102, so that acoustic horn 36 is moved from the "non-working" position toward anvil 38. Alternatively, or in conjunction with movement of acoustic horn 36, anvil 38 may also be moved toward acoustic horn 36, as noted above.

As the excess covering material at corner 26 is pressed or sandwiched between acoustic horn 36 and anvil 38, the mechanical vibrations applied to covering 24 by horn 36 rapidly heat the covering material. The rapid heating causes covering 24 to locally melt at or about the point of contact between working surface 50 of horn 36 and the working edge 64 of anvil 38. Local melting of covering 24 is limited to the area in which pressure is applied by working edge 64 of anvil 38. The area of pressure application is highlighted in FIG. 7A along working edge 64 of anvil 38 and in FIG. 7B on working surface 48 of acoustic horn 36. The pressure of acoustic horn 36 against anvil 38 also causes the covering material to be separated or sheared along horizontal edge portion 76 and vertical edge portion 78.

Once the vibratory energy is removed from covering 24, the melted portions of the covering material quickly join together. The timely application of air from air nozzle 112 facilitates the joining of the contacting portions of covering 24 prior to removal of partition panel cover 20 from between acoustic horn 36 an anvil 38. The air expelled from air nozzles 112 and 114 also pushes the trimmed covering material toward vacuum inlet tube 110, wherein it is removed from partition panel cover 20 by vacuum 108. While the disclosed method of ultrasonically welding the contacting portions of covering 24 and trimming the excess material transpires virtually simultaneously, it will be appreciated that the step of trimming the excess covering material may occur prior to or subsequent to the step of welding the contacting portions of covering 24 together.

As noted above, the exemplary partition panel 20 cover employs a fusible material, such as woven polyester, as the covering 24. In woven polyester, the fibers positioned along weld line 28 are fused, providing a crisp, clean seam 30 free of frayed edges. It is also recognized that a non-fusible material may also be used as covering 24. In this embodiment, the non-fusible material is woven, laminated or locally coated with a separate ultrasonically fusible or heat activated material, such as a thermoplastic film or heat activated adhesive. For example, one or more ultrasonically fusible fibers may be woven into the matrix of a generally non-fusible fabric, such as cotton. In another example, a non-fusible fabric may be coated with a heat-activated adhesive that is activated and cured by ultrasonic energy.

The present invention has been particularly shown and described with reference to the foregoing embodiments, which are merely illustrative of the best modes for carrying out the invention. It should be understood by those skilled in the art that various alternatives to the embodiments of the invention described herein may be employed in practicing the invention without departing from the spirit and scope of the invention as defined in the following claims. It is intended that the following claims define the scope the invention and that the method and apparatus within the ascope of these claims and their equivalents be covered thereby. This description of the invention should be understood to include all novel and non-obvious combinations of elements described herein, and claims may be presented in this or a later application to any novel and non-obvious combination of these elements. Moreover, the foregoing embodiments are illustrative, and no single feature or clement is essential to all possible combinations that may be claimed in this or a later application.

What is claimed is:

1. A method for securing a cover about a frame, the method comprising:
   providing aflexible covering and a fraxne, the frarne including a peripheral edge and at least one corner;
   folding a portion of the flexible covering over the peripheral edge of the frame at or about the corner to provide an excess portion of the flexible covering; and
   ultrasonically welding a seam of contacting portions of the flexible covering together.

2. The method of claim 1, further including the step of trimming the excess portion of the flexible covering from the covering and frame.

3. The method of claim 2, wherein the trimming the excess portion of the flexible covering is performed in connection with the welding step.

4. The method of claim 1, wherein the flexible covering comprises an ultrasonically fusible material.

5. The method of claim 1, wherein the step of providing a flexible covering includes providing a non-ultrasonic fusible material and applying an ultrasonically fusible or heat activated material to the non-ultrasonically fusible material.

6. The method of claim 1, wherein the seam is substantially invisible.

7. The method of claim 1, further including providing an acoustic horn and an anvil, and pressing or sandwiching contacting portions of the flexible covering between the acoustic horn and anvil.

8. The method of claim 7, wherein the acoustic horn is vibrated at a frequency to ultrasonically weld contacting portions of the flexible covering.

9. An apparatus for securing a flexible covering about a frame having a peripheral edge and at least one corner, the apparatus comprising:
   an acoustic horn and an anvil, at least one of the acoustic horn and the anvil moveable toward the other to press or sandwich one or more contacting portions of the flexible covering therebetween at or about the corner of the frame; and
   wherein the agoustic horn or anvil is configured to weld contacting of the flexible covering together at or about the frame: and
   an acoustical control system that vibrates the acoustic horn and transmits mechanical vibrations to weld the contacting portions of the flexible covering together.

10. The apparatus of claim 9, wherein the frequency of the vibrations is selectively controlled by the control system.

11. The apparatus of claim 9, wherein at least one of the acoustic horn and the anvil is selectively moveable toward the other with a force to trim an excess portion of the flexible covering.

12. The apparatus of claim 11 further including a removal system for removing the trimmed covering from the corner of the supportive frame.

13. The apparatus of claim 12, wherein the removal system includes a vacuum, an air nozzle or blower, a gravity-based mechanism, or a combination the foregoing.

14. The apparatus of claim 9 further including at least one air nozzle for applying air to at least partially cool the welded flexible covering.

15. The apparatus of claim 9, wherein the anvil includes a working edge that defines a weld line between the acoustic horn and the anvil, the weld line includes components extending in two different directions.

16. The apparatus of claim 15, wherein the working edge is substantially L-shaped and includes a generally vertical edge portion that corresponds to a first component of the weld line and a generally horizontal edge portion that corresponds to a second component of the weld line.

17. The apparatus of claim 15, wherein the anvil includes a recess having an alignment surface that extends from the working edge at a predetermined angle.

18. The apparatus of claim 15, wherein the acoustic horn includes a substantially flat working surface and the flexible covering is enrgaable between the working surface and the working edge of the anvil.

19. The apparatus of claim 18, wherein the acoustic horn includes a recess having an alignment surface that extends from the working surface of the acoustic horn at a predetermined angle.

20. The apparatus of claim 9, wherein the acoustical control system includes a generator that transfers high frequency electrical voltage to a converter.

21. The apparatus of claim 9 further including an actuation controller.

22. The apparatus of claim 9 further including a base upon which the acoustical control system, the acoustic horn, and the anvil are supported.

23. The apparatus of claim 22, wherein the base includes a guide rail for positioning the frame and flexible covering between the acoustic horn and the anvil.

* * * * *

UNITED STATES PATENT AND TRADEMARK OFFICE
CERTIFICATE OF CORRECTION

PATENT NO. : 6,821,367 B1
DATED : November 23, 2004
INVENTOR(S) : Douglas B. MacDonald et al.

It is certified that error appears in the above-identified patent and that said Letters Patent is hereby corrected as shown below:

Column 7,
Line 39, delete "aflexible" and insert -- a flexible; delete "fraxne" and insert frame; delete "frarne" and insert -- frame. --

Column 8,
Line 11, after "about", insert -- the corner of --

Signed and Sealed this

First Day of March, 2005

JON W. DUDAS
*Director of the United States Patent and Trademark Office*